INVENTOR
A. E. BACHELET
BY
R. O. Corell
ATTORNEY

May 20, 1952          A. E. BACHELET          2,597,428

CHECKING MEANS FOR PULSE COUNTING CIRCUITS

Original Filed Jan. 7, 1950          2 SHEETS—SHEET 2

INVENTOR
A. E. BACHELET
BY
R. O. Covell
ATTORNEY

Patented May 20, 1952

2,597,428

UNITED STATES PATENT OFFICE 2,597,428

CHECKING MEANS FOR PULSE COUNTING CIRCUIT

Albert E. Bachelet, New York, N. Y., assignor to Bell Telephone Laboratories, Incorporated, New York, N. Y., a corporation of New York Original application January 7, 1950, Serial No. 137,452. Divided and this application March 31, 1951, Serial No. 218,618

8 Claims. (Cl. 177—311)

This invention relates generally to signaling systems and more particularly to arrangements in such systems for detecting and counting signal impulses.

The invention has for its main object to improve gas tube counting chains. In present-day signaling systems, such as may be used with automatic telephone systems, continuous improvement is being sought to increase the speed of response and the reliability of circuits used for detecting and counting signals. In the telephone field in particular, continuous energy is expended toward developing circuits which will respond more accurately and more reliably at a rapid rate to signals, such as dial pulses or the like. An exemplary embodiment of the present invention is shown herein as incorporated in an automatic telephone system of the cross-bar type, such as disclosed in Patent 2,585,904 to A. J. Busch of February 19, 1952. A skeletonized disclosure of the Busch system is shown in another copending application of J. W. Dehn, Serial No. 57,398, filed October 29, 1948. The Dehn disclosure shows some details of an originating register circuit of the cross-bar system which circuit is shown herein modified to embody the present invention.

The function of an originating register, among others, in the cross-bar system disclosed by Busch and Dehn, is to receive, detect, count, and register dial pulse digits transmitted thereto by a calling subscriber during the initiation by the latter of a request for a connection. It is the improvement of such counting circuits with which the present invention, in one of its forms, finds utility in improving the reliability of response of such originating registers and in simplifying such registers.

Briefly, the present invention contemplates a chain of gas-filled tubes for counting impulses and means for applying all impulses to all tubes at the same time. Circuit means is provided for interconnecting said tubes whereby a first impulse will fire only the first tube and whereby the firing of any one tube conditions the other tubes such that only the next succeeding tube fires on the next pulse. Therefore, the firing of successive tubes in the chain corresponds to a succession of impulses in a series. Arrangement is made to recycle the chain at the end of a series of impulses such that the chain will count the next series as before for the first series. A check circuit is provided for detecting the failure of any tube to fire when it is supposed to fire in response to an impulse.

The checking circuit improvement characterizes the present invention over the prior art and such circuit is shown embodied in a counting circuit disclosed and claimed in application Serial No. 137,452, filed January 7, 1950 by A. E. Bachelet and F. K. Low and allowed February 14, 1952, of which this application is a division, which circuit is a variety of the type disclosed and claimed in a copending application of J. W. Dehn, Serial No. 136,008, filed December 30, 1949 and entitled "Pulse Counting and Registration System." The checking means comprises a gas tube arrangement, the starter electrode circuit of which is energized by each pulse which is applied to the counting tube chain. A delay means is interposed in the starter electrode circuit of the checking tube such that the impulse is not effective to fire that tube until after a measurable delay time. The circuit arrangement is such that if at the duration of this delay time no counting tube has been fired, the checking tube will fire to indicate trouble. If, however, a counting tube has fired, the checking tube will be prevented from firing.

The main object of the present invention is the provision of the above outlined checking circuit means for a gas tube counting chain. Other features, particularly pointed out in appended claims, will be apparent from the subsequent detailed exemplary embodiment of the invention, the drawings of the disclosure being described generally as follows:

Figs. 1 and 2 combined show parts of a cross-bar originating register embodying the present invention;

Fig. 1 shows the pulse detecting and counting circuit embodying the invention; and, Fig. 2 shows circuit means for registering the digits counted.

GENERAL DESCRIPTION

The present invention is herein disclosed as embodied in an automatic telephone system such as is disclosed in the Busch Patent 2,585,904. Busch discloses in detail a cross-bar system wherein originating register circuits are used for transmitting dial tone to calling subscribers, counting pulses of called digits, registering the called digits, and seizing an idle marker circuit for the purpose of having such a marker complete the desired connection. Since the present invention relates particularly to pulse counting and registering circuits only certain portions of an originating register circuit have been disclosed and described herein.

Another copending application of J. W. Dehn, Serial No. 57,398, filed October 29, 1948, discloses a skeletonized arrangement of the Busch disclosure including an originating register circuit in some detail. The Dehn and Busch disclosures may be referred to for details omitted from the present description as unnecessary for a complete understanding of the present invention.

The register relay arrangement shown in Fig. 2 is a variety of relay circuit arrangements disclosed and claimed in an application of F. K. Low, Serial No. 137,323, filed January 7, 1950, and entitled "Pulse Counting and Registration Circuit."

As may be obtained from the Busch or Dehn disclosure, the general sequence of events during the originating of a call by a subscriber is as follows:

(1) The calling subscriber lifts his receiver thereby seizing an idle marker circuit and automatically informing the seized marker that a dial tone connection is desired;

(2) The seized marker tests for and seizes an idle originating register circuit;

(3) The marker interconnects the calling line with the seized originating register circuit over the cross-bar switch train and then the marker releases;

(4) The originating register transmits dial tone to the calling subscriber;

(5) The calling subscriber dials the digits of the called number or other desired destination;

(6) The originating register receives, follows, and counts the pulses of each digit and registers such digit;

(7) When sufficient digits have been registered therein the originating register seizes an idle marker circuit and transfers thereto, among other items of information pertaining to the call, the digits so registered; and, (8) The marker, when it has received all of the information from the originating register, releases the originating register, completes the call, and then releases itself.

Since the present invention is embodied only in circuits of an originating register, in so far as the present disclosure is concerned, the subsequent description will not cover items 1, 7, and 8 above. Such matters are fully dealt with by Busch and Dehn and are not necessary to the present description.

DETAILED DESCRIPTION

Seizure of originating register

Figure 1:
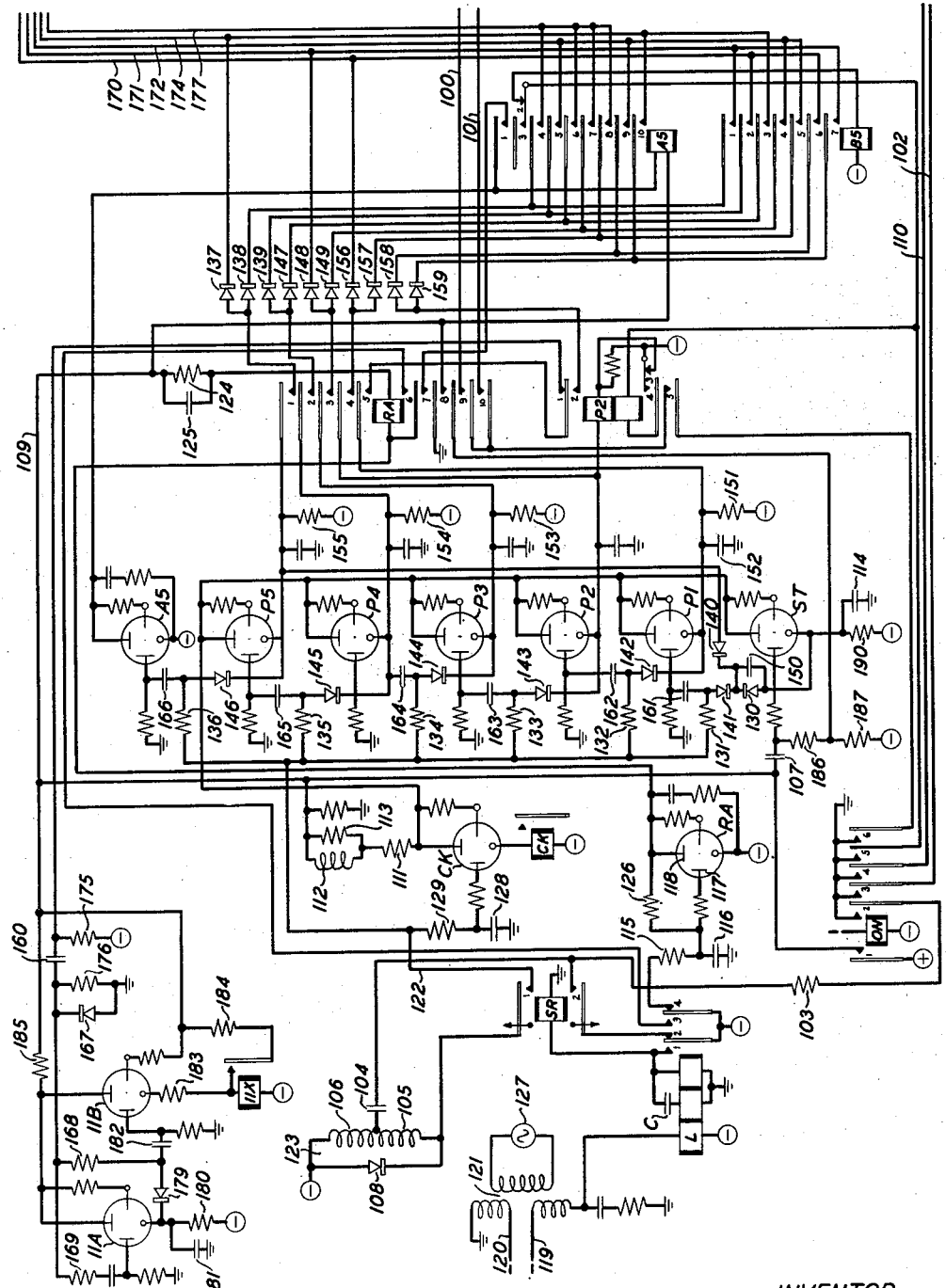
Figure 2:
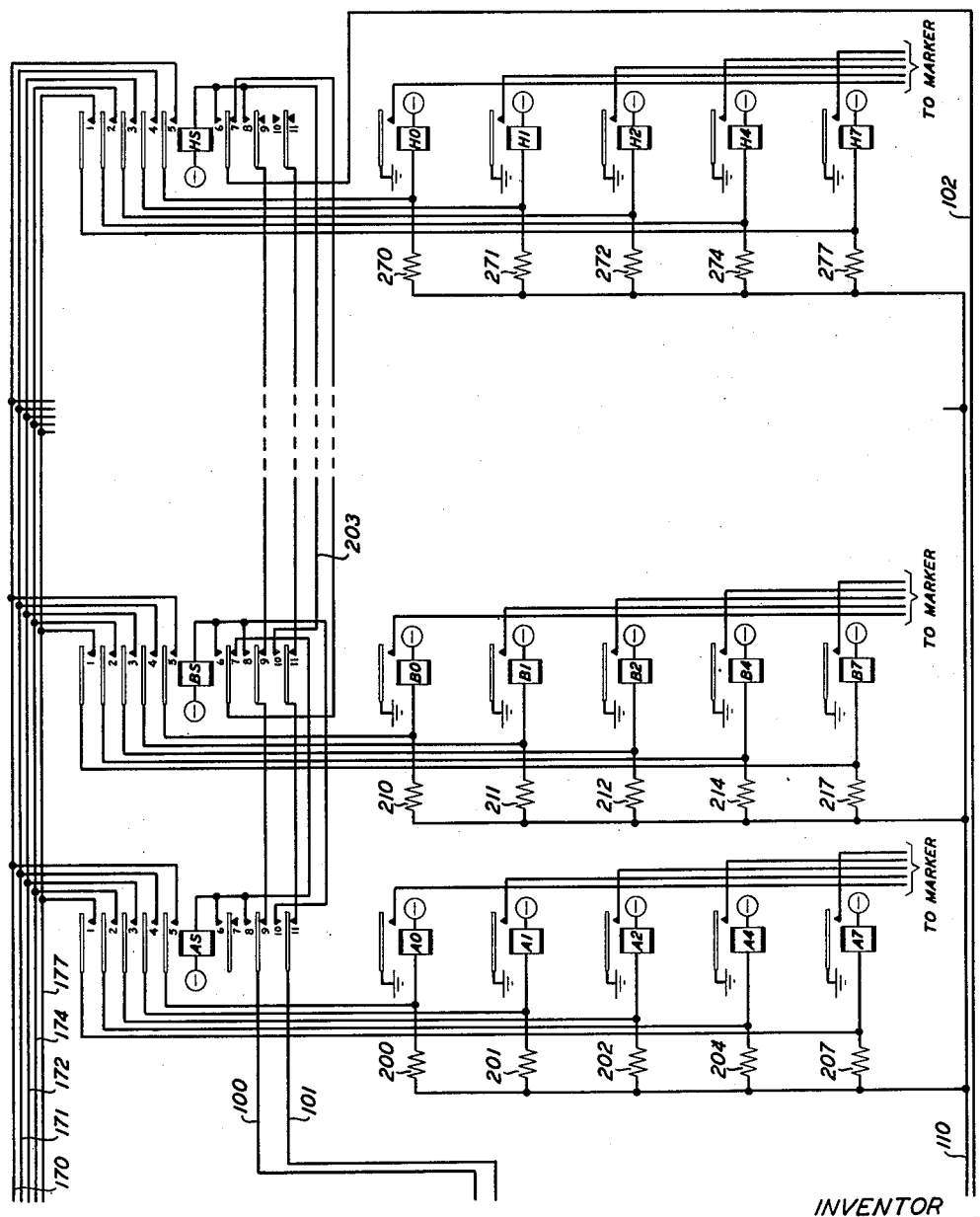

When the marker seizes an idle originating register circuit such as is disclosed partly in Figs. 1 and 2, the off-normal relay On(1) thereof is operated by the marker.

Relay ON(1), upon operating, partly prepares the originating register circuit for operation as follows:

(1) Ground is applied over contact 6 of relay ON(1), contact 5 of relay P2(1) when relay P2(1) is operated, to the armatures of relay RA(1) associated with contacts 9 and 10 of that relay and, when relay RA(1) is operated, extending over conductors 100 and 101 to Fig. 2 for purposes to be described hereinafter;

(2) Ground is applied over contact 5 of relay ON(1), contact 2 of relay A5(1), to negative battery through the winding of relay B5(1), whereupon relay B5(1) operates;

(3) Ground is applied over contact 5 of relay ON(1) to the lower winding of relay P2(1) for the purposes of locking relay P2(1) operated, as will be described hereinafter;

(4) Ground is applied over contact 3 of relay ON(1), conductor 102, contact 7 of relay HS(2), contact 7 of relay BS(2), to negative battery through the winding of relay AS(2), whereupon relay AS(2) operates:

(5) Ground is applied over contact 2 of relay ON(1), through resistance 103, to condenser 104 of the pulse forming network 123, comprising windings 105 and 106 and an asymmetrical resistance, such as dry rectifier 108, connected between negative battery and the upper armature of relay SR(1);

(6) Positive battery is connected over contact 1 of relay ON(1) to the off-normal battery conductor 109; and, (7) Ground is connected over contact 4 of relay ON(1) to conductor 110 and thence in parallel through resistances 200, 201, 202, 204, and 207 for the A digit register relays A0(2), A1(2), A2(2), A4(2), and A7(2), and through resistances 210 through 217 for the B digit relays B0(2) to B7(2), and likewise through resistances 270 to 277 for the H register relays H0(2) to H7(2), and through the winding of each such relay to negative battery.

In regard to item (7) above, each of the register relays of Fig. 2, such as relay A0(2), will conduct a current limited by the resistance in series therewith, such as resistance 200. This amount of current will be referred to hereinafter as the "holding" current, which is insufficient to operate a relay but is sufficient to hold a relay operated once it has been operated by an additional amount of current. Since these register relays of Fig. 2 utilize only front or make contacts a preferred embodiment thereof may be the magnetic reed type of relay such as is disclosed in the Patent 2,289,830 to W. B. Ellwood of July 14, 1942.

In regard to item (5) above, when ground is applied over contact 2 of relay ON(1) and through resistance 103 to the right-hand side of condenser 104, the left-hand side of condenser 104 is driven temporarily to substantially ground potential. At this instant the dry rectifier 108 represents a high impedance to this pulse. These rectifiers, such as rectifier 108, are arranged such that when the arrow side thereof is positive with respect to the other side of the rectifier, said rectifier will represent a low impedance, and when the reverse polarity situation occurs, said rectifier will represent a high impedance. Under the assumed condition, at which time ground appears on the left-hand side of condenser 104, rectifier 108 represents a high impedance for this pulse. Condenser 104 will charge very quickly in a circuit including negative battery, through the winding 106, through condenser 104 and resistance 103, to ground over contact 2 of relay ON(1). The fairly large charging current for condenser 104 passing through the coil 106 induces into the other coil 105 a total voltage with reference to negative battery of approximately 100 volts positive, which appears on the upper armature of relay SR(1). Since relay SR(1) is not operated at this time 100-volt positive pulse is ineffective. The left-hand side of condenser 104 returns to substantially negative battery potential as soon as condenser 104 becomes fully charged. Therefore, on the upper armature of relay SR(1) there will appear a short pulse of approximately 100-volt amplitude in a positive direction with respect to negative battery.

In regard to item (6) above, positive battery is applied over contact 1 of relay ON(1) to the off-normal battery conductor 109, through condenser 107, to the starter electrode of tube ST(1). Since the cathode of tube ST(1) is at negative battery potential through resistance 190, tube ST(1) will fire and the discharge will transfer to a circuit extending from negative battery, through resistance 190, to the cathode of tube ST(1), across the main gap discharge path of tube ST(1), through resistance 111 and through impedances 112 and 113, to positive battery on conductor 109. The presence of condenser 114 connected to the cathode of tube ST(1) will effectively hold the cathode of tube ST(1) at negative battery potential during the initial transient period. Eventually, condenser 114 will become charged to a potential on the cathode of tube ST(1) which is approximately 100 volts positive with respect to negative battery.

*Interconnection between calling subscriber and originating register*

After the seizure by a marker of an idle originating register circuit as above outlined, the marker effects an interconnection over the crossbar switch train between the seized register and the calling line, thereby closing the ring and tip conductors 119 and 120 of the register over the calling line loop. Relay L(1) is operated in a circuit extending from ground through the upper left secondary winding of the dial tone transformer 121, conductor 120, over the switch train and the line loop, back over conductor 119, through the lower left secondary winding of the dial tone transformer 121, and through the winding of relay L(1) to negative battery. Relay L(1), upon operating, operates relay SR(1) in an obvious circuit over contact 1 of relay L(1). Relay SR(1), upon operating, closes at its contact 1 a circuit from the pulse network or pulse transformer 123 to the pulsing conductor 122 for a purpose to be described hereinafter.

The structure of the relay L(1) is preferably, but not necessarily, of the mercury contact type similar to the structure of the mercury contact relay disclosed in Patent 2,577,602 of December 4, 1951 to E. T. Burton. The armatures, or armature, of relay L(1) are biased towards the contacts 2 and 4. This bias, as in the type of relay disclosed by Burton, may be both partly mechanical due to the usual spring and partly magnetic due to the presence of a permanent magnet, if desired, influencing contacts 2 and 4. When relay L(1) is operated, under closed loop conditions, the current flow through the right winding is arranged to counteract partly the effect of the current flowing through the left winding. This, in effect, increases the total bias tending to release the armatures when relay L(1) is operated. This is to improve the releasing response of relay L(1), thereby aiding its performance under line conditions which tend to retard the release of relay L(1). The purpose of the middle winding in series with condenser C(1) is well known to provide a measure of pulse correction action, as described for instance in Patent 2,029,723 to L. H. Johnson and F. K. Low of February 4, 1936.

It will be observed that prior to the operation of relay L(1), negative battery was applied over contact 4 of relay L(1), through resistance 115, and through condenser 116 to ground, whereby condenser 116 was charged at its upper plate to a potential of negative battery. Upon the operation of relay L(1), condenser 116 will begin to acquire a charge positive with respect to negative battery in a circuit extending from positive battery over contact 1 of relay ON(1) through resistance 124, through the winding of relay RA(1), through resistance 126, and through condenser 116 to ground. Condenser 116 will thereupon begin to acquire a positive charge with reference to the negative charge that it previously had acquired. If relay L(1) remains operated for a sufficient length of time, condenser 116 will, during that time, acquire a sufficient charge of positive potential with respect to negative battery on the cathode of tube RA(1) to cause an ionization across the starter electrode gap from cathode of tube RA(1) to the starter electrode 117 of tube RA(1).

Assuming for the present that the calling subscriber delays before dialing the additional digit for a sufficient time to permit condenser 116 to acquire such a charge, tube RA(1) will fire, thereby causing a discharge across the main gap in a circuit extending from negative battery to the cathode of tube RA(1), across the main discharge path of tube RA(1) to the main anode 118, through the winding of relay RA(1), through condenser 125 (which, under the transient condition, represents substantially a short circuit across resistance 124) to off-normal positive battery on conductor 109. Relay RA(1) will operate in this circuit, locking over its contact 6 to negative battery over contact 3 of relay L(1). This negative locking battery for relay RA(1) extends back to the main anode of tube RA(1) thereby extinguishing tube RA(1). Relay (RA(1), upon operating, accomplishes no useful function at this time. The operation of relay RA(1), as with the discharge through tube RA(1), is for the purpose of timing the interdigital pause for extending the pulse count to the registers of Fig. 2, as will be explained hereinafter.

Upon the first release of relay L(1) responsive to the first open line period of the first pulse, relay RA(1) will be released and condenser 116 will be fully discharged over contact 4 of relay L(1).

Dial tone is transmitted from the source 127 thereof, through transformer 121, to the calling subscriber who may then begin to dial the called number. It will be assumed that the calling subscriber begins to dial the initial digit before condenser 116 can acquire sufficient charge to fire tube RA(1), as above described.

*Counting initial digit of one*

An initial digit of one pulse, unless followed directly by a second digit of one pulse as will be explained, is assumed not to be a legitimate signal, because of the frequency with which such erroneous indication may be effected by accidental manipulation of the subscriber's dial, by spurious electrical impulses, etc. Such an initial digit is absorbed on the basis of the above assumption; but, as will be explained, it is not discarded in view of the fact that a second digit of one pulse is presumed to indicate a legitimate 11 prefix for a toll directing code or special service code of 11X, where X may be any digit from 2 to 9.

When relay L(1) releases, in response to the first open loop period of the first pulse of the first digit, condenser 116 in the starter electrode circuit of tube RA(1) will be discharged as previously described over contact 4 of relay L(1), and relay RA(1) will be released if it had previously been operated. Relay SR(1), due to its slow-releasing characteristic, will remain operated during the release periods of relay L(1) representing pulses of digits.

Upon the first release of relay L(1), negative battery is applied over contact 2 of relay L(1), contact 2 of relay SR(1) to condenser 104. Since at this time the left-hand side of condenser 104 is held substantially at negative battery, the application to the right-hand side of condenser 104 of negative battery will drive the left-hand side of condenser 104 to a potential which will be approximately negative battery plus negative battery; that is, assuming that negative battery is —48 volts, if —48 volts is applied to the right-hand side of condenser 104, the left-hand side thereof will be driven temporarily to approximate —96 volts. It will be observed that under these conditions the upper or arrow side of rectifier 108 will be substantially 48 volts more positive than the lower plate of rectifier 108. Under these conditions rectifier 108 represents a very low impedance shunt across the winding 106 of transformer 123 thereby precluding any substantial negative pulse over contact 1 of relay SR(1). Therefore, release of relay L(1) will not substantially affect the pulsing conductor 122 which is in circuit with the starter electrodes of the counting tubes P1(1) through P5(1).

At this time it will be observed that contact 1 of relay SR(1) is substantially at negative battery potential and consequently condenser 128, in the starter electrode circuit of tube CK(1), will have acquired a charge of substantially negative battery in the circuit including resistor 129, contact 1 of relay SR(1), to negative battery through the windings of transformer 123.

Upon the reoperation of relay L(1), at the end of the first pulse of the first digit, condenser 116 in the starter electrode circuit of tube RA(1) is permitted to begin to acquire a charge, as above described, for measuring the interdigital pause. Relay L(1), upon reoperating, reenergizes relay SR(1) and removes at contact 2 of relay L(1) negative battery from the right side of condenser 104. Ground will again be applied over contact 2 of relay ON(1) to the right-hand side of condenser 104 thereby, during the transient period, driving the left-hand side of condenser 104 to substantially ground potential. Under these circumstances it will be appreciated that varistor or dry rectifier 108 will have a voltage condition thereon whereby the upper or arrow side of the rectifier will be some 48 volts negative with respect to the lower plate thereof. Under these circumstances rectifier 108 will represent a high impedance and charging current for condenser 104 will be permitted to flow through the winding 106 of transformer 123. As a result of the flow of this current through winding 106, approximately a 100-volt pulse is produced at contact 1 of relay SR(1) by autotransformer action through the coil 105 of transformer 123. This positive pulse of approximately 100 volts with respect to negative battery appears on the pulsing conductor 122.

It will be observed that the pulsing conductor 122 is connected in parallel to the starter electrode circuits of all of the tubes P1(1), P2(1), P3(1), P4(1), P5(1) and A5(1) through respective resistances 131, 132, 133, 134, 135 and 136 and through respective condensers 161, 162, 163, 164, 165 and 166. It will also be observed that the cathodes of tubes P1(1), P3(1), P4(1) and P5(1) are connected to negative battery through respective resistances 151, 153, 154 and 155 and that the cathode of tube P2(1) is connected to negative battery through the upper winding of relay P2(1) and over contact 3 of relay P2(1). Each of the tubes P2(1), P3(1), P4(1), P5(1) and A5(1) has associated therewith a rectifier 142, 143, 144, 145 and 146 connected between the starter electrode circuit of the associated tube and the cathode of the previous tube, such as rectifier 146 for tube A5(1) connected between the junction of resistance 136 and condenser 166 to the cathode of tube P5(1). Rectifier 141, associated with tube P1(1), is connected to the cathode of tube ST(1) through an additional rectifier 130 having in parallel therewith a condenser 150 for a purpose to be described hereinafter. Rectifier 141 associated with tube P1(1) is also connected to negative battery through an additional rectifier 140 and resistance 155 in the cathode circuit of tube P5(1).

The above-described rectifier circuit arrangements, associated with the various tubes of the counting chain, are arranged such that at this time tube P1(1) is the only tube which can fire in response to the first positive pulse on pulsing conductor 122. Since tube ST(1) is the only tube which is conducting at this moment the cathodes of tubes P1(1), P2(1), P3(1), P4(1) and P5(1) will all be held at substantially negative battery potential. Since the positive pulse on conductor 122 is approximately 100 volts positive with respect to negative battery, it is obvious that for all parts of this positive pulse the rectifiers connected to the cathodes of tubes P1(1) through P5(1) represent substantially a low impedance shunt to said pulses. Therefore, none of the tubes P2(1) through A5(1) can fire in response to the first positive pulse on conductor 122.

Since tube ST(1) is conducting, its cathode, due to the voltage drop across resistance 190, will be maintained at approximately 100 volts positive with respect to negative battery. Therefore, rectifier 130 will represent a low impedance to the positive pulse on conductor 122. At the same time, the right-hand or arrow side of rectifier 140 is held substantially at negative battery potential on the cathode of tube P5(1), thereby making rectifier 140 a high impedance with respect to the positive pulse on conductor 122. Under these circumstances the rectifier 141 connected to the starter electrode circuit of tube P1(1) will represent a high impedance to the positive pulse on conductor 122 thereby ionizing the starter gap of tube P1(1) and permitting a discharge therethrough in a circuit extending from negative battery through resistance 151, cathode of tube P1(1) to the main anode of tube P1(1), through the common anode load for all the pulse tubes consisting of resistance 111 and impedances 112 and 113 to positive off-normal battery on conductor 109.

When tube P1(1) fires, as above described in response to the first positive pulse on the pulsing conductor 122, it causes an additional voltage drop in the common anode load including resistance 111 for all of the pulse counting tubes thereby reducing the main anode voltage on tube ST(1) to such a value that tube ST(1) extinguishes. When tube ST(1) extinguishes it cannot refire due to the following two considerations:

(1) The cathode of tube ST(1) is held temporarily at substantially 100-volt positive potential with respect to negative battery by reason of the presence of condenser 114; and, (2) Condenser 107 in the starter electrode circuit of tube ST(1) has on the right side thereof a charge of substantially negative battery potential.

Eventually the positive charge on condenser 114 will be discharged through resistance 190 thereby raising the cathode of tube ST(1) to substantially negative battery potential to, in effect, make rectifier 130 appear as a high impedance to positive pulses on conductor 122. When tube P1(1) fired, as above described thereby reducing the available main anode voltage for tube ST(1) to extinguish the latter, the condenser 152 connected to the cathode of tube P1(1) maintains substantially negative battery potential temporarily on the cathode of tube P1(1) such that the drop in the main anode voltage will not be sufficient to prevent tube P1(1) from firing. Eventually, condenser 152 charges up to substantially 100 volts positive with respect to negative battery due to the discharge current flowing through resistance 151 in the cathode circuit of tube P1(1). The approximately 100-volt rise in the positive direction of the potential of the cathode of tube P1(1) will be recognized, in view of previous discussion, as reversing the polarity of voltage across rectifier 142 thereby, in effect, causing rectifier 142 to appear as a high impedance to any subsequent positive pulse on conductor 122. This, in effect, conditions tube P2(1) to fire on the next pulse.

Under the conditions when tubes ST(1) and P5(1) are both not conducting, as is the condition for the next pulses on conductor 122, it will be appreciated that rectifiers 140 and 130 both represent a high impedance to a positive pulse which may occur on the pulsing conductor 122. For the cases where it is desired that the next pulse on conductor 122 will fire tube P3(1), or P4(1), or P5(1), it is not desired that this pulse also be effective to fire tube P1(1). For those cases condenser 150, which is in shunt of rectifier 130, is effective under the transient conditions concurrent with the sharp positive pulse on the pulsing conductor 122, to represent substantially a short circuit around the rectifier 130 thereby in effect placing the bottom side of rectifier 141 at substantially negative battery potential from the cathode of tube ST(1) making rectifier 141 substantially a low impedance shunt for these pulses on conductor 122.

As has been mentioned previously, upon the reoperation of relay L(1) at the end of the first pulse, condenser 116 was permitted to begin acquiring a positive charge in a previously described circuit extending from ground through condenser 116, through resistance 126, through the winding of relay RA(1), through resistance 124 to positive off-normal battery on conductor 109. The time constant of this charging circuit is such that if the reoperation of relay L(1) lasts for a short interval of time representing merely a pause between pulses of a digit, then condenser 116 will not acquire sufficient charge by the time relay L(1) again releases to discharge condenser 116 to fire tube RA(1); but, if the reoperation of relay L(1) lasts for a relatively long interval of time representing an interdigital pause, then condenser 116 will acquire sufficient charge, before relay L(1) again releases, to fire tube RA(1).

As has been assumed, the first pulse is considered to represent a one-pulse digit. Relay L(1) will remain operated long enough to permit the condenser 116 to acquire a charge sufficient to fire tube RA(1). When tube RA(1) fires, as has been previously described, the main discharge occurs in a circuit extending from negative battery across the main discharge gap of tube RA(1), through the winding of relay RA(1), through condenser 125 to positive battery on conductor 109. Relay RA(1) operates in this discharge path and locks over its contact 6 to negative battery over contact 3 of relay L(1). This negative locking battery is extended back to the main anode 118 of tube RA(1), thereby extinguishing tube RA(1) and discharging condenser 116.

Relay RA(1), upon operating, extends a circuit from the cathode of each of the tubes P5(1), P4(1), P3(1) and P2(1) over respective contacts 1, 2, 3 and 4 of relay RA(1), to respective pairs of rectifiers 137—138, 139—147, 148—149 and 156—157. Likewise the cathode of tube P1(1) is extended over contact 5 of relay RA(1), contact 1 of relay P2(1), to condenser 160 associated with tubes 11A(1) and 11B(1). If relay P2(1) were operated, under conditions to be described hereinafter, the connection from the cathode of tube P1(1) would be extended over contact 2 of relay P2(1) to the pair of rectifiers 158—159.

Conductors 170, 171, 172, 174 and 177 extend over respective contacts 5, 4, 3, 2 and 1 of relay AS(2) to the left-hand sides of the windings of respective A digit register relays A0(2), A1(2), A2(2), A4(2) and A7(2). Two out of these five conductors are to be energized by positive battery thereon, on a two-out-of-five code basis, for operating two of the five A digit register relays of Fig. 2 in accordance with the following code:

| Digit | Conductors Energized | Digit | Conductors Energized |
| --- | --- | --- | --- |
| 1 | 170-171 | 6 | 172-174 |
| 2 | 170-172 | 7 | 170-177 |
| 3 | 171-172 | 8 | 171-177 |
| 4 | 170-174 | 9 | 172-177 |
| 5 | 171-174 | 0 | 174-177 |

The cathode circuits of all tubes, which are extended by the operation of relay RA(1) to the pairs of rectifiers above described, are all at substantially negative battery potential, thereby in effect making the top four pairs of rectifiers high impedances. The bottom two rectifiers 158—159 have no potential on their arrow sides due to the fact that relay P2(1) is not operated at this time. Thus, none of the A digit register relays of Fig. 2 will be operated in response to the counting of the initial one-pulse digit, and such initial one-pulse digit is absorbed in a manner to be described shortly.

Due to the fact that relay P2(1) is not operated, the positive voltage of substantially 100-volt value with respect to negative battery on the cathode of tube P1(1) is extended over contact 5 of relay RA(1), contact 1 of P2(1), to the condenser 160 as previously described. Before relay RA(1) operated, condenser 160 was charged to negative battery potential on its right side in a circuit extending from ground through resistance 176, through condenser 160, and through resistance 175 to negative battery. When the positive voltage of approximately 100 volts positive with respect to negative battery is extended from the cathode of tube P1(1) to the right side of condenser 160, this positive voltage drives the left-hand side of condenser 160 temporarily to a voltage of approximately 100 volts positive with respect to negative battery. At this point the polarity of rectifier 167 is such as to represent a high impedance to this pulse. This positive voltage will quickly charge condenser 160 to the positive voltage value whereupon the left-hand side of condenser 160 will rapidly rise to about 100 volts and then return again to substantially ground potential. This positive pulse on the left-hand side of condenser 160 is applied through resistance 169 and condenser 178 to the starter electrode of tube 11A(1), whereupon tube 11A(1) fires and a discharge occurs from ground through condenser 181, cathode of tube 11A(1), across the main anode discharge path of tube 11A(1), through the anode load resistance 185 to positive battery on the off-normal conductor 109. Since the cathode of tube 11A(1) is held temporarily at substantially negative battery potential by the presence of condenser 181, the rectifier 179 connected to the cathode of tube 11A(1) will represent a low impedance shunt to the positive pulse as far as the starter electrode circuit of tube 11B(1) is concerned. Tube 11B(1) therefore will not fire on this first positive impulse.

Relay RA(1) upon operating extends, over its contact 8, positive battery on conductor 109 to the junction between resistances 186 and 187 associated with the starter electrode circuit of tube ST(1). This positive voltage discharges condenser 107, driving the starter electrode of tube ST(1) sufficiently in the positive direction to ionize tube ST(1), whereupon tube ST(1) discharges in a circuit including ground through condenser 114, cathode of tube ST(1), across the main anode discharge path of tube ST(1), to the main anode of tube ST(1), through the anode load 111 common to all counting tubes, to positive battery on conductor 109. Since the main anode of tube P1(1) is supplied by positive battery through the same common anode resistor 111, as was the main anode of tube ST(1), the reduction of main anode voltage due to the additional discharge through tube ST(1) will reduce the main anode voltage of tube P1(1) to such a value as will cause the extinguishing of tube P1(1), as has been previously explained. This reverts the starting chain to its initial condition preparatory to receiving, detecting, and counting the number of pulses in the second digit.

*A second digit of one pulse*

If a second digit of one pulse is received and counted by the originating register circuit, it is assumed that this is a legitimate indication of a 11 prefix to a toll directing code or to a special 11X code of a service nature.

When relay L(1) releases in response to the first open line loop period pulse of the second digit, condenser 116 is discharged over contact 4 of relay L(1) and negative battery is applied over contact 2 of relay L(1), contact 2 of relay SR(1), to the pulse transformer 123 which, as has been previously explained due to the presence of the rectifier 108, shunts or short-circuits this negative pulse such that it is not effective on the pulsing conductor 122.

When relay L(1) reoperates at the end of the first pulse of the second digit, condenser 116 is permitted to begin to acquire a charge to measure the interdigital timing, as has been previously explained, and the removal of negative battery from contact 2 of relay L(1) causes the pulse transformer 123 to produce a positive pulse on the pulsing conductor 122 as has been explained above. (Relay RA(1) was released when relay L(1) released during the first pulse of the second digit.) The first pulse on pulsing conductor 122 fires tube P1(1) and the firing of tube P1(1) extinguishes tube ST(1).

Under the assumption that this second digit is also a one-pulse digit, condenser 116 will acquire sufficient charge to fire tube RA(1), thereby operating relay RA(1), which relay locks under the control of the operated relay L(1), as previously explained, extinguishing tube RA(1) and discharging condenser 116. Upon the operation of relay RA(1) as above, the positive voltage on the cathode of tube P1(1) is extended over contact 5 of relay RA(1), contact 1 of relay P2(1) to the right-hand side of condenser 160 thereby producing on the left-hand side of condenser 160 the above-mentioned short positive pulse. By this time the condenser 181 in the cathode circuit of tube 11A(1) has acquired a charge of substantially 100 volts positive with respect to negative battery at the cathode of tube 11A(1), thereby reversing the polarity across the rectifier 179 and making it appear as a high impedance to the next positive pulse from condenser 160. This second positive pulse through condenser 160 therefore will be transmitted through resistance 168 to the starter electrode of tube 11B(1), firing tube 11B(1) in a discharge circuit extending from negative battery through the winding of relay 11X(1), resistance 183, across the cathode-main anode discharge circuit of tube 11B(1), through the anode load 185, common to tubes 11A(1) and 11B(1), to positive battery on conductor 109. The additional drop in voltage through the resistance 185, due to the additional firng of tube 11B(1), reduces the main anode voltage of tube 11A(1) to such an extent that tube 11A(1) extinguishes. Relay 11X(1) operates in the discharge circuit of tube 11B(1) and locks over its contact, through resistance 184, to off-normal positive battery on conductor 109. This positive locking battery, when extended to the cathode circuit of tube 11B(1) over the contact of relay 11X(1), raises the cathode potential of tube 11B(1) to such an extent as to extinguish tube 11B(1) by effectively short-circuiting the main anode gap of tube 11B(1).

It will be appreciated that any additional one-pulse digits which may come along later will be absorbed in the 11A(1) and 11B(1) tube circuits. It will be apparent, as has been previously explained, that no digit of the value of one pulse can be transmitted to the registers of Fig. 2 until relay P2(1) operates, as will be explained later. It will also be appreciated that the operation of the relay 11X(1) may be used for transmitting additional information relating to the receipt and counting of a 11X prefix code to a subsequently seized marker.

*Receipt of a digit of value of at least two pulses*

Let it be assumed that the next digit is of two or more pulses, say four.

When relay L(1) releases during the first pulse of the digit, condenser 116 is discharged and negative battery is applied over contact 2 of relay L(1), contact 2 of relay SR(1), through condenser 104, to the pulsing transformer 123. When relay L(1) reoperates the end of the first pulse, condenser 116 is permitted to start charging to measure the interdigital pause, and condenser 104 is again charged to create a positive pulse on the pulsing conductor 122. Since tube ST(1) is conducting at this time, the varistor 141 will effectively represent a high impedance to the positive pulse on conductor 122 thereby causing tube P1(1) to fire. Tube P1(1) in conducting extinguishes tube ST(1).

When relay L(1) releases during the second pulse, condenser 116 is discharged and condenser 104 is discharged. When relay L(1) reoperates at the end of the second pulse, condenser 116 begins to time the interdigital pause and condenser 104 is again charged to create a positive pulse on conductor 122. The positive pulse on conductor 122 fires tube P2(1) because the rectifier 142 in the starter electrode circuit of tube P2(1) is effectively a high impedance because of the high positive voltage on the cathode of the conducting tube P1(1). Tube P2(1) conducts in a circuit extending from negative battery, contact 3 of relay P2(1), upper winding of relay P2(1), cathode of tube P2(1), main anode discharge path of tube P2(1), to positive voltage on conductor 109 through the common anode load resistance 111 and impedances 112 and 113. Tube P2(1) in conducting extinguishes tube P1(1) by reducing the voltage at the main anode of tube P1(1) to such an extent as to extinguish tube P1(1). Tube P2(1), in conducting in the above-traced circuit, operates relay P2(1). Relay P2(1) locks in a circuit from negative battery over contact 4 of relay P2(1) through the lower winding of relay P2(1) to off-normal ground over contact 5 of relay ON(1).

In a similar manner, the third pulse fires tube P3(1) and extinguishes tube P2(1) and the fourth pulse fires tube P4(1), thereby extinguishing tube P3(1). When relay L(1) reoperates at the end of the fourth pulse, condenser 116 will begin to acquire a charge to thereby measure the interdigital timing period. As has been assumed, this particular digit contains four pulses, therefore relay L(1) will remain operated at the end of the fourth pulse for a length of time sufficient for condenser 116 to acquire sufficient positive charge to fire the tube RA(1).

When tube RA(1) fires, relay RA(1) operates and locks as prevously described, thereby extinguishing tube RA(1) and discharging condenser 116. Upon the operation of relay RA(1), the high positive voltage existing at the cathode of tube P4(1), due to the fact that the latter tube is conducting, is extended over contact 2 of relay RA(1) to the left-hand or arrow sides of rectifiers 139 and 147. The right-hand sides of rectifiers 139 and 147 extend over respective contacts 2 and 3 of relay B5(1) to respective conductors 170 and 174, over respective contacts 5 and 2 of the A digit steering relay AS(2), to the left-hand sides of the windings of respective relays A0(2) and A4(2). Since the conduction of tube P4(1) makes the left or arrow side of rectifiers 139 and 147 of positive potential with respect to negative battery, these rectifiers will represent low impedance in the above-traced circuits, whereupon relays A0(2) and A4(2) will effectively have placed on the left-hand sides of their respective windings positive battery. The resulting increase of current through relays A0(2) and A4(2) will produce a value of current sufficient to operate these two relays, whereupon relays A0(2) and A4(2) operate to register on a two-out-of-five basis the first or A digit of the value of four pulses.

After the registration in the register relays A0(2) and A4(2) of the A digit of four pulses, tube P4(1) will be extinguished and relay RA(1) will subsequently release upon the release of relay L(1) during the first pulse of the next succeeding digit. When tube P4(1) is extinguished or when relay RA(1) releases under these conditions, positive battery is removed from the left side of respective windings of relays A0(2) and A4(2) thereby decreasing the current flowing through these relays to the original "holding" value. This value of current, as has been previously explained, however, is sufficient to hold operated any relays of the digit register group which have been operated. Consequently, relays A0(2) and A4(2) will remain operated under the control of off-normal ground on conductor 110. This arrangement of register relays wherein no back or break contacts are necessary for holding circuits may be of the type disclosed in Patent 2,289,830 to W. B. Ellwood of July 14, 1942.

Relay RA(1) upon operating extends positive potential on conductor 109, over contact 8 of relay RA(1) to resistance 187 to discharge condenser 107 and fire tube ST(1), thereby extinguishing tube P4(1) and reverting the pulse counting chain to its normal counting condition.

Furthermore, upon the operation of relay RA(1), ground is extended over contact 6 of relay ON(1) contact 5 of relay P2(1), over contacts 9 and 10 of relay RA(1), conductors 100 and 101 to the steering relay circuit of Fig. 2. Ground on conductor 100 extends over contact 8 of relay AS(2) to hold relay AS(2) operated when the holding circuit therefor is broken upon the operation of relay BS(2). Ground on conductor 101 is extended over contact 10 of relay AS(2), to negative battery through the winding of the B digit steering relay BS(2). Steering relay BS(2) operates in this circuit after the extinguishing of tube P4(1). Relay BS(2) locks over its contact 6 and over contact 7 of relay HS(2) to off-normal ground on conductor 102. The operation of the B digit steering relay BS(2) closes the five conductors 170, 171, 172, 174 and 177 over its respective contacts 5, 4, 3, 2 and 1 to the B digit register relays B0(2) to B7(2) preparatory to registering the second or B digits transmitted by the calling subscriber.

It will be observed that the ground circuits on conductors 100 and 101 leading to Fig. 2 are not effective until after relay P2(1) operates. This insures that no advance of the steering relays of Fig. 2 is permitted until at least one digit has been detected and counted which comprises two or more pulses.

It is also to be observed that up to this point relay B5(1) has been operated and relay A5(1) has been released. As will be appreciated from subsequent description, relay B5(1) operates to extend to the register relays of Fig. 2 any digit which has been counted and having five or less pulses in the digit; and, relay A5(1) will be operated with relay B5(1) released whenever a digit is counted by the circuit of Fig. 1 as containing six or more pulses. The operation of one or the other of relays B5(1) or A5(1) selectively extends the two-out-of-five conductors from each of the five pairs of rectifiers to various of the five conductors leading to the registers of Fig. 2, such that under one condition the conduction to any one of the tubes P1(1) through P5(1) may represent either of two different digits depending upon whether the pulse count of a particular digit is below or above 5. For instance, with relay B5(1) operated, as in the above example, the conduction of tube P4(1) indicates a pulse count of 4. However, if relay A5(1) were operated instead of relay B5(1), then the conduction of a tube such as P4(1) would extend positive battery over contact 2 of relay RA(1) through rectifiers 139 and 147, over contacts 5 and 6 of relay A5(1), to conductors 172 and 177, thereby indicating, on a two-out-of-five basis, the digit 9. Therefore, in one case, tube P4(1) upon conducting indicates the digit 4 (below 5) and, in the other case, conduction of the tube P4(1) indicates the digit 9 four pulses above 5).

*Receipt of B digit*

Let it be assumed that the next digit is greater than or above 5, such as the digit 8. The counting tubes will progress as above described for the first five pulses such that at the end of the fifth pulse the following conditions appear:

(1) Relay L(1) has reoperated at the end of the fifth pulse;

(2) Tube P5(1) is conducting and all other tubes are extinguished; and (3) Relay P2(1) is operated and locked.

Upon conduction through tube P5(1) the cathode of tube P5(1) rises to substantially 100 volts positive potential with respect to negative battery, thereby conditioning varistor 146 such that the latter will represent a high impedance to the next pulse on conductor 122. The cathode of tube P5(1) also applies this high positive voltage to the right-hand or arrow side of rectifier 140 connected to rectifier 141 in the starter electrode circuit of tube P1(1). This positive voltage on the right-hand side of rectifier 140 effectively makes rectifier 140 a low impedance to positive pulses on conductor 122, thereby in effect making rectifier 141 a high impedance to such pulses. Therefore, upon the next pulse, that is, the sixth pulse on conductor 122, both tubes A5(1) and P1(1) will fire.

When relay L(1) releases during the sixth pulse, condenser 116 is discharged. When relay L(1) reoperates at the end of the sixth pulse, the pulsing conductor 122 will have applied thereto a high positive pulse from the pulse transformer 123. This positive pulse on conductor 122 will fire both tubes A5(1) and P1(1). Tube P1(1) upon conducting, extinguishes tube P5(1) since both of these tubes use the same common anode load resistance 111 and impedances 112 and 113, as has been explained previously. Tube A5(1) conducts in a circuit extending from negative battery, to cathode of tube A5(1), across the main anode conducting path tube A5(1), through the winding of relay A5(1), to positive battery on the off-normal conductor 109, thereby operating relay A5(1). Relay A5(1), upon operating, releases relay B5(1) by opening the operating circuit for the latter relay at contact 2 of relay A5(1).

Tube A5(1) remains conducting and relay A5(1) remains operated for successive pulses of the same digit.

In response to the seventh positive pulse on the pulsing conductor 122, tube P2(1) fires, extinguishing tube P1(1). Furthermore, upon the eighth pulse on conductor 122, tube P3(1) conducts, thereby extinguishing tube P2(1).

At the end of the eighth pulse, when relay L(1) reoperates, the latter will remain operated sufficiently at this time to permit condenser 116 to fire tube RA(1), thereby operating and locking relay RA(1) as above, to in turn extinguish tube RA(1) and discharge condenser 116.

Relay RA(1), upon operating, extends the positive potential on the cathode of tube P3(1), over contact 3 of relay RA(1) to the left-hand or arrow side of the pair of rectifiers 148 and 149. These rectifiers, under the action of the positive potential on their arrow sides, will act as low impedances, whereupon positive battery is extended through rectifier 148 directly to conductor 171. Positive voltage is extended through rectifier 149 and over contact 7 of relay A5(1) to conductor 177. Positive battery on conductors 171 and 177 is extended over respective contacts 4 and 1 of the B digit steering relay BS(2) to the left-hand sides of the windings of respective B digit register relays B1(2) and B7(2). The current flowing through the windings of relays B1(2) and B7(2) increases sufficiently to operate these two relays, thereby registering on a two-out-of-five code basis the B digit 8 by the operation of the B digit register relays B1(2) and B7(2).

Relay RA(1) upon operating extends ground over its contact 7, contact 1 of relay A5(1), to ground the main anode of tube A5(1), thereby extinguishing tube A5(1). Relay RA(1), upon operating, also extends positive battery over its contact 8, to resistance 187 to discharge condenser 107 and refire tube ST(1), thereby extinguishing tube P3(1) to revert the counting tube chain to its normal condition. Ground is extended from contact 6 of relay ON(1), over contact 5 of relay P2(1), over contacts 9 and 10 of relay RA(1), over conductors 100 and 101. Ground on conductor 100 extends over contact 9 of relay AS(2) and contact 8 of relay BS(2) to hold relay BS(2) operated when the locking circuit therefor is broken upon the operation of the next steering relay CS (not shown). Ground on conductor 101 is extended over contact 11 of relay AS(2), contact 10 of relay BS(2), over conductor 203, to negative battery through the winding of the next steering relay CS (not shown) which operates and locks to off-normal ground on conductor 102 under the control of the next or DS steering relay (not shown).

When relay RA(1) is released, during the first pulse of the next digit, the previously operated steering relay BS(2) releases leaving the subsequently operated steering relay CS (not shown) operated and locked under control of the fourth steering relay over off-normal ground on conductor 102 preparatory to operating on a two-out-of-five basis the C digit register relay (not shown) of Fig. 2.

*Subsequent digits*

The receipt, detection, counting, steering and registering of subsequent digits are accomplished similarly to the above discussion and further detailed analysis of the circuit operation is considered unnecessary.

*Checking circuit*

The checking tube CK(1), with associated circuits, is provided to indicate the failure of any tube ST(1) through A5(1) to ionize at a time when its respective ionization should occur.

It will be noted that the pulsing conductor 122 is connected to resistance 129 and through condenser 128 to ground at the starter electrode circuit of tube CK(1). It will also be noted that at any time prior to the production by transformer 123 of a positive pulse on the pulsing conductor 122, condenser 128 acquires a negative charge in the circuit extending from ground, through condenser 128, through resistance 129, over contact 1 of relay SR(1), to negative battery through the windings 105 and 106 of the pulse transformer 123. At such time as the pulse transformer 123 produces a positive pulse, this positive pulse is applied to the starter electrode circuit of tube CK(1). The negative charge on condenser 128 will be held there due to the presence of condenser 128 for a length of time depending upon the time constant of the circuit involving resistance 129 and condenser 128. This means that the positive pulse on the pulsing conductor 122 will not be made effective to fire tube CK(1) until a measured interval of time after the application to that pulsing conductor 122 of the positive pulse generated by the pulse transformer 123. At such time as the voltage on condenser 128 shall have risen to a positive value sufficient to fire tube CK(1), ionization will occur across the starter electrode gap of that tube, which ionization will be manifested in a discharge across the main anode discharge gap of tube CK(1) provided there is sufficient main anode voltage at tube CK(1) to sustain the discharge. If there is sufficient voltage at the main anode of tube CK(1), this discharge will occur in a circuit extending from negative battery through the winding of relay CK(1), cathode of tube CK(1), main anode of tube CK(1), through the anode load resistance 111 and impedances 112 and 113, to positive battery on conductor 109.

It will be recalled that each of the tubes ST(1) through P5(1) has its main anode connected to positive battery through the same common anode load resistance 111 and impedances 112 and 113. These load impedances and resistance are arranged such that if any of the tubes ST(1) through P5(1) fires and conducts a main discharge current, the voltage drop through these common anode impedances will be sufficient to reduce the main anode voltage of tube CK(1) sufficiently such that the tube CK(1) cannot sustain a main gap discharge.

It will be recalled that at the same time that the starter electrode timing delay circuit of tube CK(1) was measuring an interval of time, the pulsing conductor 122 applied to the starter electrodes of all of the counting tubes the high positive pulse. If that positive pulse fails to fire one of the tubes ST(1) through P5(1) by the time that the condenser 128 in the starter electrode circuit of tube CK(1) fires tube CK(1), then a main discharge current will be sustained in tube CK(1), operating relay CK(1) to indicate a signal of improper operation of the pulse counting circuit. On the other hand, if one of the tubes ST(1) through P5(1) does fire in response to the positive impulse on the pulsing conductor 122, then the main anode voltage of tube CK(1) will have been reduced sufficiently such that tube CK(1) cannot fire when the starter electrode thereof ionizes the starter electrode-cathode gap of tube CK(1).

It will be appreciated then that the tube CK(1), with its associated circuit elements, is a checking means for determining the failure or non-failure of one of the tubes of the counting chain to fire in response to an impulse on the pulsing conductor 122.

*Seizing an idle marker*

When the originating register has registered, in its relays of Fig. 2, sufficient digits to warrant seizure of an idle marker circuit for completion of the call, such a marker may be seized under the control, as disclosed by Busch and Dehn above, of the steering relays of Fig. 2. For instance, relay HS(2) will operate after the seventh or G digit (exclusive of an 11 prefix) has been registered. Relay HS(2) may be arranged to complete the marker start circuit after receipt and registration of seven digits, which may comprise a complete calling number of three office code digits and four numerical.

If an initial 11 prefix is detected and registered by the operation of relay 11X(1), relay BS(2) may complete the marker start circuit for seizing an idle marker after the X digit of the 11X code is registered in the A register of Fig. 2. In this case the operated relay 11X(1) may be arranged to transmit a special signal to the seized marker.

*Completion of connection*

When an idle marker is seized, the information registered in the digit registers of Fig. 2, along with other information, is transferred to the marker on a two-out-of-five basis by ground on two out of five conductors from the contacts of each group of register relays.

The marker releases the originating register, thereby returning all apparatus of Figs. 1 and 2 to normal, completes the indicated connection, and releases leaving the connection under the supervision of a trunk, for instance.

It is to be understood that the above described arrangements are illustrative of the application of the principles of the invention. Numerous other arrangements may be devised by those skilled in the art without departing from the spirit and scope of the invention.

What is claimed is:

1. In a signaling system, means for generating at least one impulse, a gas-filled detecting tube for detecting said impulse, a gas-filled check tube, means for applying said impulse to said detecting tube to operate said detecting tube, delay means, means for applying said impulse simultaneously to said check tube through the agency of said delay means, signal means controlled by said check tube, said check tube operable by said impulse to actuate said signal means only if said detecting tube fails to operate during the delay period determined by said delay means, and means controlled by the operation of said detecting tube during said delay period to prevent the operation of said check tube at the end of said delay period.

2. In a signaling system, means for generating at least one impulse, a gas-filled detecting tube for detecting said impulse, a gas-filled check tube, means for applying said impulse to said detecting tube to operate said detecting tube, a delay network, means for applying said impulse simultaneously to said check tube through said delay network, signal means controlled by said check tube, said check tube operable by said impulse to actuate said signal means only if said detecting tube fails to operate during the delay period determined by said delay network, and means interconnecting said tubes and controlled by the operation of said detecting tube during said delay period to prevent the operation of said check tube at the end of said delay period.

3. In a signaling system, means for generating at least one impulse, a gas-filled detecting tube for detecting said impulse, a gas-filled check tube, each of said tubes comprising a cathode and a main anode and a starter electrode, means for applying said impulse to the starter electrode circuit of said detecting tube to cause conduction therein, a delay network in the starter electrode circuit of said check tube, means for applying said impulse simultaneously to the starter electrode circuit of said check tube through said delay network, signal means controlled by said check tube, said impulse causing conduction in said check tube to operate said signal means only if said detecting tube fails to conduct during the delay period determined by said delay network, a load common to both tubes, and means including said common load controlled by conduction in said detecting tube during said delay period to prevent conduction in said check tube at the end of said delay period.

4. In a signaling system, means for generating at least one impulse, a gas-filled detecting tube for detecting said impulse, a gas-filled check tube, each of said tubes comprising a cathode and a main anode and a starter electrode, means for applying said impulse to the starter electrode circuit of said detecting tube to cause conduction therein, a delay network in the starter electrode circuit of said check tube, means for applying said impulse simultaneously to the starter electrode circuit of said check tube through said delay network, signal means controlled by said check tube, said impulse causing conduction in said check tube to operate said signal means only if said detecting tube fails to conduct during the delay period determined by said delay network, a main anode load common to both tubes, and means including said common main anode load controlled by conduction in said detecting tube during said delay period to prevent conduction in said check tube at the end of said delay period.

5. In a signaling system, means for generating impulses, a plurality of gas-filled tubes for counting said impulses, a gas-filled check tube, means for applying said impulses simultaneously to all of said counting tubes, means for permitting only one counting tube to operate responsive to the first impulse, gating means interposed between said tubes for enabling operation of successive counting tubes in response to successive impulses, delay means, means for applying said impulses to said check tube through the agency of said delay means, signal means controlled by said check tube, said check tube operable by said impulses to actuate said signal means only if a counting tube fails to operate during the delay period determined by said delay means, and means controlled by the operation of any one of said counting tubes during said delay period to prevent operation of said check tube at the end of said delay period.

6. In a signaling system, means for generating impulses, a plurality of gas-filled tubes for counting said impulses, a gas-filled check tube, means for applying said impulses simultaneously to all of said counting tubes, means for permitting only one counting tube to operate responsive to the first impulse, gating means interposed between said tubes for enabling operation of successive counting tubes in response to successive impulses, a delay network, means for applying said impulses to said check tube through said delay network, signal means controlled by said check tube, said check tube operable by said impulses to actuate said signal means only if a counting tube fails to operate during the delay period determined by said delay network, and means interconnecting said check tube with each of said counting tubes controlled by the operation of any one of said counting tubes during said delay period to prevent operation of said check tube at the end of said delay period.

7. In a signaling system, means for generating impulses, a plurality of gas-filled tubes for counting said impulses, a gas-filled check tube, each of said tubes comprising a cathode and a main anode and a starter electrode, means for applying said impulses simultaneously to the starter electrode circuits of all of said counting tubes, means for permitting only one counting tube to conduct responsive to the first impulse, gating means interposed between said tubes for enabling conduction in successive counting tubes in response to successive impulses, a delay network in the starter electrode circuit of said check tube, means for applying said impulses to the starter electrode circuit of said check tube through said delay network, signal means controlled by said check tube, said impulses causing conduction in said check tube to operate said signal means only if a counting tube fails to operate during the delay period determined by said delay network, a load common to said check and counting tubes, and means including said common load controlled by the operation of any one of said counting tubes during said delay period to prevent conduction in said check tube at the end of said delay period.

8. In a signaling system, means for generating impulses, a plurality of gas-filled tubes for counting said impulses, a gas-filled check tube, each of said tubes comprising a cathode and a main anode and a starter electrode, means for applying said impulses simultaneously to the starter electrode circuits of all of said counting tubes, means for permitting only one counting tube to conduct responsive to the first impulse, gating means interposed between said tubes for enabling conduction in successive counting tubes in response to successive impulses, a delay network in the starter electrode circuit of said check tube, means for applying said impulses to the starter electrode circuit of said check tube through said delay network, signal means controlled by said check tube, said impulses causing conduction in said check tube to operate said signal means only if a counting tube fails to operate during the delay period determined by said delay network, a main anode load common to said check and counting tubes, and means including said common load controlled by the operation of any one of said counting tubes during said delay period to prevent conduction in said check tube at the end of said delay period.

ALBERT E. BACHELET.

REFERENCES CITED

The following references are of record in the file of this patent:

UNITED STATES PATENTS

| Number | Name | Date |
| --- | --- | --- |
| 1,801,657 | Buyko | Apr. 21, 1931 |
| 2,389,204 | Ludl et al. | Nov. 20, 1945 |
| 2,530,093 | Speed | Nov. 14, 1950 |